March 17, 1953     D. B. BECKER     2,631,295
ARTIFICIAL HAND
Filed Jan. 27, 1949
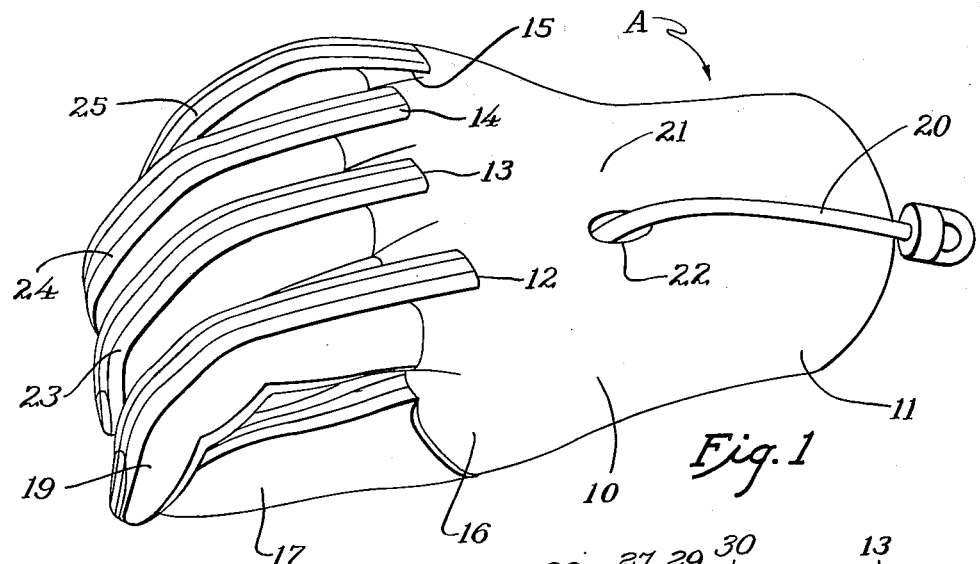
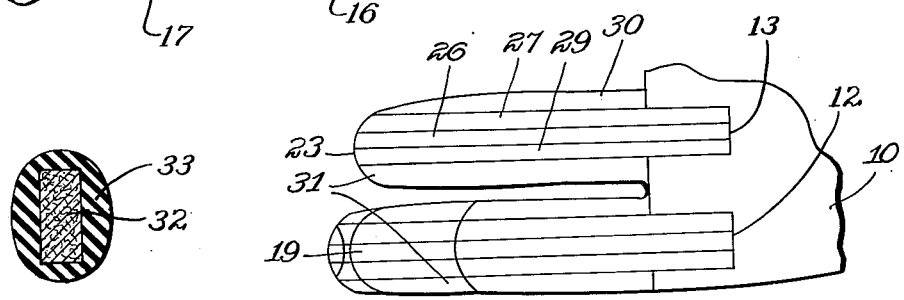
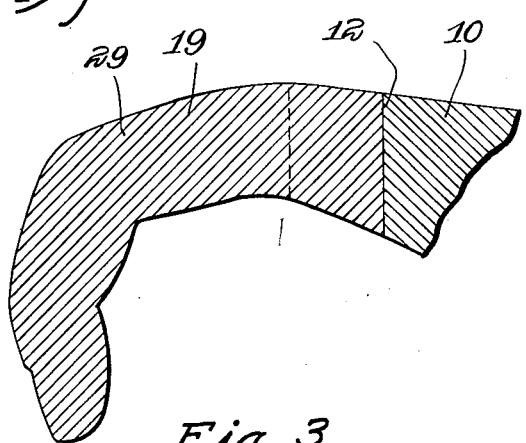
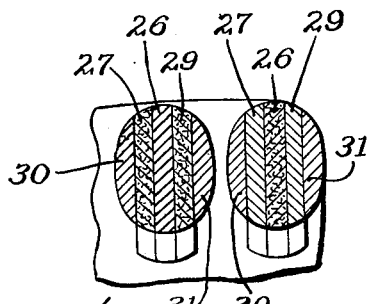
Inventor
Daniel B. Becker
By Robert M. Dunning Patented Mar. 17, 1953

2,631,295

UNITED STATES PATENT OFFICE 2,631,295

ARTIFICIAL HAND

Daniel B. Becker, St. Paul, Minn.

Application January 27, 1949, Serial No. 73,019

4 Claims. (Cl. 3—12)

My invention relates to an improvement in artificial hand and deals particularly with a hand having fingers formed of laminated material.

Artificial hands have been made out of materials of many different types. Wood is often used as the material and has many advantages over materials of other types. However, when the fingers of the hand are formed of wood, some difficulty occurs from time to time with breakage. This is particularly true as the fingers are usually curved and therefore the grain of the wood can not be continuous throughout the length of the fingers. Plastic material has also been used for the purpose. However, such plastic is ordinarily considerably more costly than wood and does not have all of the advantages thereof. Molded plastic has also been employed for the purpose, but the production of plastic artificial hands is costly due to the large number of sizes and shapes of hands which are produced.

I have found that excellent artificial hands may be formed by producing a hand body of wood or similar material and by attaching to this body fingers formed of laminated material including a lamination of hard fiber. This material may be produced at relatively low cost and the fiber actually produces fingers which are much superior to those formed of wood alone. The fiber lamination embedded in the fingers seems to provide somewhat of a cushioning effect between the plies of wood and prevents the finger from being easily broken or chipped. The fiber is capable of bending slightly, thus allowing sufficient flexibility in the fingers to prevent damage thereto and at the same time supports the wooden plies and seems to prevent injury thereto.

A feature of the present invention lies in the provision of an artificial hand having fingers formed of laminated material including a lamination of hard relatively water insoluble fiber. The strength of this fiber is much greater than that of wood and as a result a greater strain may be exerted upon the fingers without injury thereto.

A feature of the present invention lies in the provision of a hand including a hand body provided with notches at the knuckle areas. Fingers of laminated material are provided with certain of the laminations projecting beyond the others. These certain laminations extend into the notches in the hand body and form a means of anchoring the fingers to the hand body. The remaining laminations abut against the end of the hand body and serve to provide a shoulder which prevents relative banding of the fingers with respect to the hand.

A feature of the present invention lies in the provision of a hand formed of a series of plies of material, one or more of which comprise a water resistant fiber formed of sheets of material glued together with a phenolic glue or other resin glue. The fiber is usually compressed under heat and pressure so as to form a solid body which is resistant to water and which is relatively hard and tough. The fiber is capable of bending slightly, but is highly resistant to tension and sheer, thereby forming a reinforcing for the fingers.

A further feature of the present invention lies in the provision of a hand having fingers thereon formed of laminated material, certain of the laminations of which are composed of fiber and in which the fiber lamination or laminations extends into a notch in the hand body. The fingers are thus firmly anchored to the hand body throughout their entire length.

These and other objects and novel features of my invention will be more clearly and fully set forth in the following specification and claims.

In the drawings forming a part of my specification:

Figure 1 is a perspective view of a hand formed in accordance with my invention before the finishing coating is applied thereto.

Figure 2 is a top plan view of a portion of the hand body and certain of the fingers showing the manner in which the fingers engage in notches in the hand body.

Figure 3 is a sectional view through one of the fingers and through a portion of the adjacent hand portion.

Figure 4 is a transverse section through a pair of fingers showing the plies of which the finger may be formed.

Figure 5 is a sectional view through a modified form of finger construction.

The hand A may be of any suitable shape or size and also may be of any suitable length. In the form of construction illustrated the hand A includes a hand body 10 which includes a wrist end 11 and which is shaped to extend to the knuckle portion of the hand. At this point the hand body is provided with spaced notches such as 12, 13, 14, and 15 which are preferably approximately rectangular in cross section. The hand is also usually shaped to provide a thumb base 16 to which the thumb 17 is secured.

In the particular form of construction illustrated the thumb 17 is pivotally supported to the thumb base portion 16 of the hand body 10 and suitable means is provided for holding the thumb in one extreme position. Preferably the thumb 17 is pivoted against the forefinger 19 so that an article may be grasped therebetween. Spring means, not illustrated in the drawings, is usually provided for urging the thumb 17 in this position and an operating cord or cable 20 extends through the back 21 of the hand through a suitable opening 22 so as to permit the thumb to be actuated by a suitable harness.

The middle finger 23, the next finger 24 and the little finger 25 are usually formed to curve to an increasing extent so as to present a natural appearance to the hand. Usually when the hand is relaxed the forefinger 19 is held relatively straight and the other fingers are successively curved to a greater extent, the little finger 25 being actually hook shaped in section. This arrangement is of advantage in a hand of the type described as the little finger may be used to support the handle of a suit case or hand bag, or may engage the handle or cord of any package.

The fingers, as well as the thumb, are preferably formed of a series of laminations adhered or cemented firmly together. As shown in Figure 4 of the drawings the fingers include a central lamination 26, a pair of adjacent laminations 27 and 29 and a pair of outer laminations 30 and 31. The laminations are usually of approximately the same outline shape at the start of the forming operations, but the surface of the fingers is carved away or otherwise removed so that the fingers are generally circular or oval in cross section.

In the form of construction illustrated the central lamination 26 is formed of a fiber to reinforce the fingers and yet to maintain the fingers in a slightly flexible state. The fiber is preferably formed of sheets of paper board or the like secured together by a resin adhesive such as a phenolic resin.

After the sheets have been adhered together, heat or pressure, or both heat and pressure are applied so as to bond the elements firmly together, the adhesive penetrating the sheets of board to form a substantially solid substance. This fiber is slightly bendable by nature, and will allow a certain amount of flexing without splitting apart. As a result the fingers are much stronger and do not split off as they sometimes do.

It will be noted that the central fiber layer 26 of the fingers extends into the notches 12, 13, 14, and 15 of the hand, thus forming a continuous reinforcement extending into the body of the hand. When the fingers have been adhered in place the hand is extremely strong and will withstand considerable shock.

If preferred the layers 27 and 29 forming plies on opposite sides of the center ply 26 may be formed of fiber rather than the single middle ply 26. It will be noted that the plies 27 and 29 also extend into the various notches of the hand and act as a means of binding the fingers to the hand so that they are reinforced throughout their entire length. Fingers formed with both laminations 27 and 29 are somewhat stronger than the fingers having a single fiber layer 26, but the resulting fingers are not twice as strong as where but one layer is used, and the single fiber layer usually provides sufficient strength so that some other part of the hand will be subjected to excess strain in many instances before the fingers will break. Thus the use of two layers of fiber is not essential to provide strength, but is advantageous in certain instances.

In Figure 5 of the drawings I disclose a modified form of construction. This figure shows a cross section through one of the fingers of the hand, and it should be understood that all of the fingers would be similarly constructed. As illustrated in Figure 5 the finger shown is provided with a central lamination 32 of fiber which extends into a notch in the hand body, in the manner previously described. This construction, however, differs from the constructions previously described in that the outer portion of the finger body is formed of molded rubber or other similar material indicated in general by the numeral 33. The molded rubber extends on either side of the center finger body 33 and also extends over the upper and lower edges of the lamination 33 so as to present a smooth unbroken outer surface. The shape of the fingers may be similar to the shape of the fingers previously disclosed.

The form of construction illustrated in Figure 5 is somewhat more expensive to manufacture and requires a considerable number of molds as each finger must be separately cast. However, the individual fingers thus formed can be added to a hand body in the manner previously described and the fingers possess substantial strength and rigidity without being extremely costly to form due to the relatively low cost of the fiber core. The construction illustrated in Figure 5 has the advantage of being a relatively finished product when once molded, whereas fingers formed of plies of material must usually be shaped after the plies are adhered together. However, fingers made entirely of plies of material are usually less costly in view of the complications in molding individual fingers.

In accordance with the patent statutes, I have described the principles of construction and operation of my artificial hand and while I have endeavored to set forth the best embodiments thereof, I desire to have it understood that obvious changes may be made within the scope of the following claims without departing from the spirit of my invention.

I claim:

1. An artificial hand including a hand body having a wrist end and a finger end, the finger end having a series of spaced notches therein, a series of fingers, each finger being formed of a series of parallel laminations of flat sheet material secured together in surface contact, certain of said laminations projecting beyond the others and snugly engaging in a corresponding notch, and means anchoring the projection portions of said certain laminations to said hand body.

2. The structure defined in claim 1 and in which the remaining of said laminations abut against the finger end of said hand body.

3. The structure defined in claim 1 in which at least one of said certain laminations is fiber, and the remaining laminations are composed of wood.

4. The structure defined in claim 1 in which the hand body is formed of wood, and in which one of said certain laminations comprises fiber and the remaining laminations are composed of wood.

DANIEL B. BECKER.

REFERENCES CITED

The following references are of record in the file of this patent:

UNITED STATES PATENTS

| Number | Name | Date |
|---|---|---|
| 234,597 | Marks | Nov. 16, 1880 |
| 879,360 | Broady | Feb. 18, 1908 |
| 1,299,747 | McClain | Apr. 8, 1919 |

FOREIGN PATENTS

| Number | Country | Date |
|---|---|---|
| 303,431 | Germany | Jan. 29, 1918 |

OTHER REFERENCES

Martin, "Artificial Limbs," published by International Labor Office, Geneva, Switzerland, 1925, p. 236. (A copy is in Div. 55 of the Patent Office.)